US005487576A

United States Patent [19]
DuVivier

[11] Patent Number: 5,487,576
[45] Date of Patent: Jan. 30, 1996

[54] AIR MANAGEMENT SYSTEM FILTER REMOVING TOOL AND METALLIC DEBRIS RETRIEVER

[76] Inventor: Michael G. DuVivier, 312 Orange Grove St., San Fernando, Calif. 91340

[21] Appl. No.: 231,844

[22] Filed: Apr. 25, 1994

[51] Int. Cl.⁶ ....................................................... B25J 1/00
[52] U.S. Cl. ........................... 294/19.1; 294/26; 294/65.5
[58] Field of Search ............................ 294/19.1, 22–24, 294/26, 65.5; 15/144.4, 145; 16/115; 403/104, 109, 327, 328

[56] References Cited

U.S. PATENT DOCUMENTS

| | | | |
|---|---|---|---|
| 580,896 | 4/1897 | Quackenbush | 294/19.1 |
| 1,208,624 | 12/1916 | Newman | 294/19.1 X |
| 1,686,889 | 10/1928 | Woods | 294/26 |
| 1,755,646 | 4/1930 | Halstead | 294/19.1 X |
| 2,218,825 | 10/1940 | Le Guillou | 294/65.5 X |
| 2,291,593 | 7/1942 | Hubbard | 294/19.1 |
| 3,384,408 | 5/1968 | Furzey | 294/65.5 |
| 4,329,076 | 5/1982 | Coreth | 403/109 |
| 4,395,840 | 8/1983 | Banks | 294/19.1 X |
| 4,508,467 | 4/1985 | Choffin | 294/19.1 X |
| 4,793,646 | 12/1988 | Michaud, Jr. | 294/19.1 |
| 4,881,338 | 11/1989 | Lung | 43/5 |
| 5,099,539 | 3/1992 | Forester | 15/143 B |
| 5,220,707 | 6/1993 | Newman, Sr. et al. | 16/115 |

Primary Examiner—Johnny D. Cherry
Attorney, Agent, or Firm—Henry S. Miller; Rhodes & Ascolillo

[57] ABSTRACT

A telescoping hand tool for retrieving filters or metallic debris in the duct work of air management systems where the tool is formed from non-metallic materials and employs a hook designed to remove a filter without significantly damaging the filter frame and alternatively a magnet designed to slide along the duct work and collect metallic debris.

1 Claim, 2 Drawing Sheets

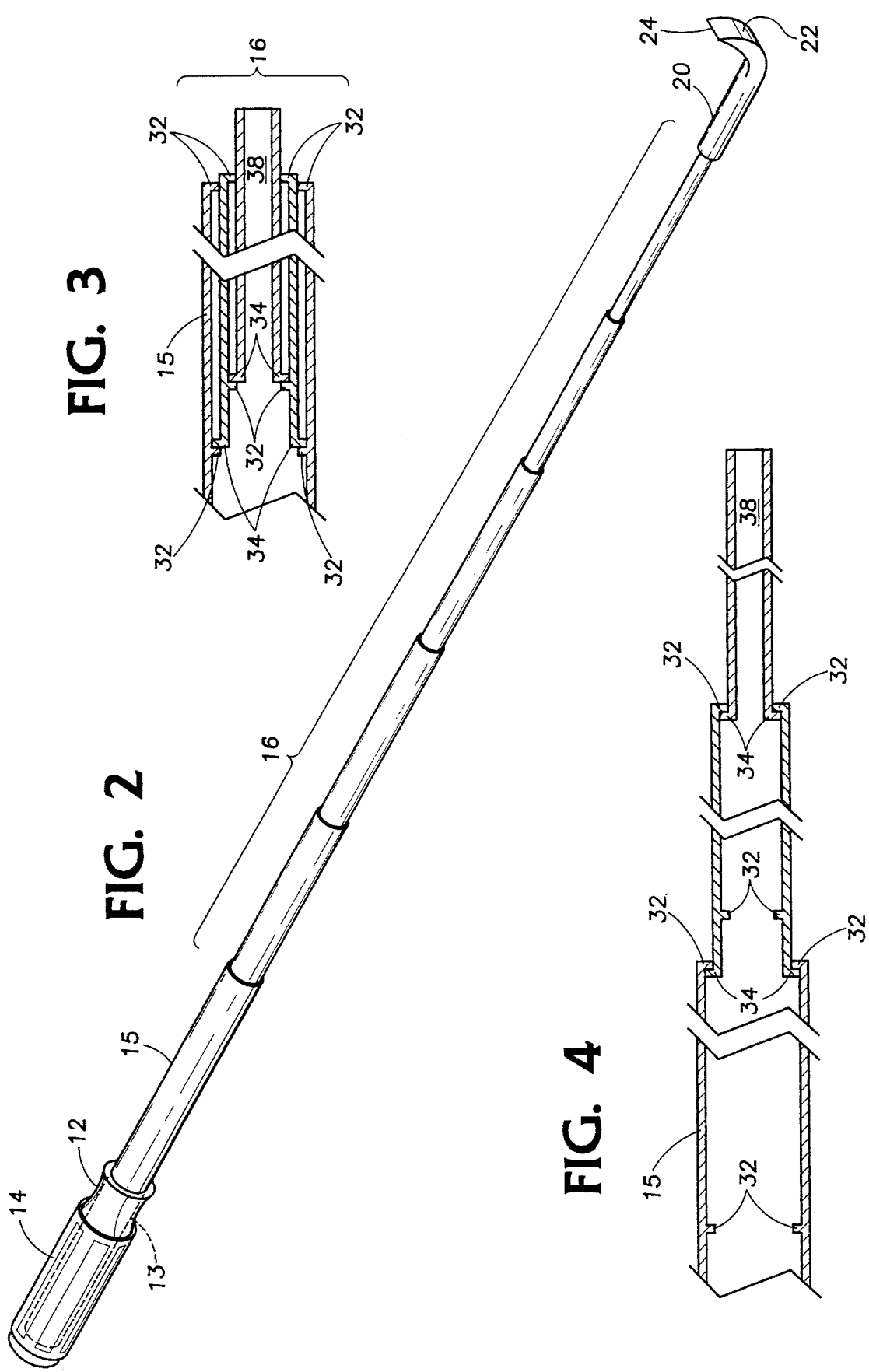

AIR MANAGEMENT SYSTEM FILTER REMOVING TOOL AND METALLIC DEBRIS RETRIEVER

BACKGROUND OF THE INVENTION

1. Field of the Invention

This invention relates generally to hand tools and more specifically to a small hand tool that is particularly adapted to removing air filters from the plenum of large air management systems.

2. Description of the Prior Art

In large applications, air conditioning systems are classified as air management systems. This is the result of the many functions they perform. A typical large system will not only heat and cool the air but it will humidify, in the winter, dehumidify in the summer and electrostatically falter the air year round. Systems of this magnitude utilize large blowers to move massive amounts of air through hundreds of feet of duct work. Engineers, designing such systems, work provide maximum efficiency in order to reduce operating costs. Placement of the equipment for ease of maintenance is a secondary consideration. As a result, frequently maintained items such as air filters are located in places fairly far removed from service openings. In these situations filters are equipped with some type of retrieval means. Since the retrieval means is only meant to be used once and then discarded, they tend to be very light duty and break on a regular basis. The enterprising technician will then use his tape measure, catching the hook at the end to snag the edge of the filter and dislodge it for removal.

Similarly, it is not uncommon for objects to enter the system and become blocked by the filter. Some of this blockage may be removed by use of an industrial vacuum cleaner. Other items, particularly metal items, may be too heavy to vacuum and may only conveniently be removed by means of a magnet.

The need then, is for a small, light weight, extendable hand tool adapted to receive the appropriate accessories to retrieve air filters of the type described in an efficient manner without destroying the dirty filter and redistributing the collected dirt within duct, and accessories to retrieve metal debris not collectible by conventional means.

The following U.S. Patents show telescoping tubes with locking arrangements to allow the sliding sections to be secured one to another: U.S. Pat No. 4,329,076 issued May 11, 1982 to Coreth, U.S. Pat. No. 4,793,646 issued Dec. 27, 1988 to Michaud, Jr. and U.S. Pat. No. 5,220,707 issued Jun. 22, 1993 to Newman, Sr. et al. The U.S. Pat. No. 4,881,338 issued Nov. 21, 1989 to Lung shows a permanently attached gaff hook having a tubular body and a plurality of telescoping sections. U.S. Pat. No. 5,099,539 issued Mar. 31, 1992 to Forester discloses a telescoping extension rod having an adjustable tool head.

The prior cited does not show a tool that could be carried on a technician's tool belt and still be able to reach into the duct work and extract the filters or debris as suggested in this invention.

SUMMARY OF THE INVENTION

A primary feature of this invention is its size. The invention is formed of a light weight plastic or composite material such as fiberglass or a Kevlar-carbon composite, for example. In its collapsed configuration the tool of the invention is twenty inches or less in length. In its extended form the tool is able to reach 10 feet. Since the invention is designed as a special purpose tool, that is to retrieve, pull back or withdraw, it is unnecessary to provide any special locking mechanism, in that the force exerted by the tool is unidirectional and that direction is causing the tool to extend. The accessories utilized with the tool are a hook and a magnet. Each accessory is threadingly engaged with the tool and strong enough to do the job intended. The hook is shaped in a manner that the filter material is moved away from its supporting frame thus allowing the working face of the hook to more positively engage the lip of the frame. In a like manner, the magnet is in the form of an elongated ellipse thereby providing a larger area for the face of the magnet while at the same time adding to the stability and controllability of the tool as it is maneuvered along the duct work.

It is therefore an object of the invention to provide a new and improved filter removing tool for air management systems.

It is another object of the invention to provide a new and improved filter removing tool for air management systems that is compact and light in weight.

It is a further object of the invention to provide a new and improved filter removing tool for air management systems that is simple and inexpensive to manufacture.

It is still another object of the invention to provide a new and improved metallic debris collector for air management systems.

It is still a further object of the invention to provide a new and improved filter removing tool that will displace and remove filters without causing significant damage.

It is another object of the invention to provide a new and improved filter removing tool which is of a durable and reliable construction.

These and other advantages, features and objects of the invention will become more apparent from the following description taken in connection with the illustrative embodiment in the accompanying drawings.

DESCRIPTION OF THE DRAWINGS

FIG. 2 is a perspective view of the invention shown in its extended form.

FIG. 3 is a cross sectional view of part of the telescoping tubes of the invention collapsed.

FIG. 4 is a cross sectional view of part of the telescoping tubes of the invention extended.

DESCRIPTION OF THE PREFERRED EMBODIMENT

Figure 1:
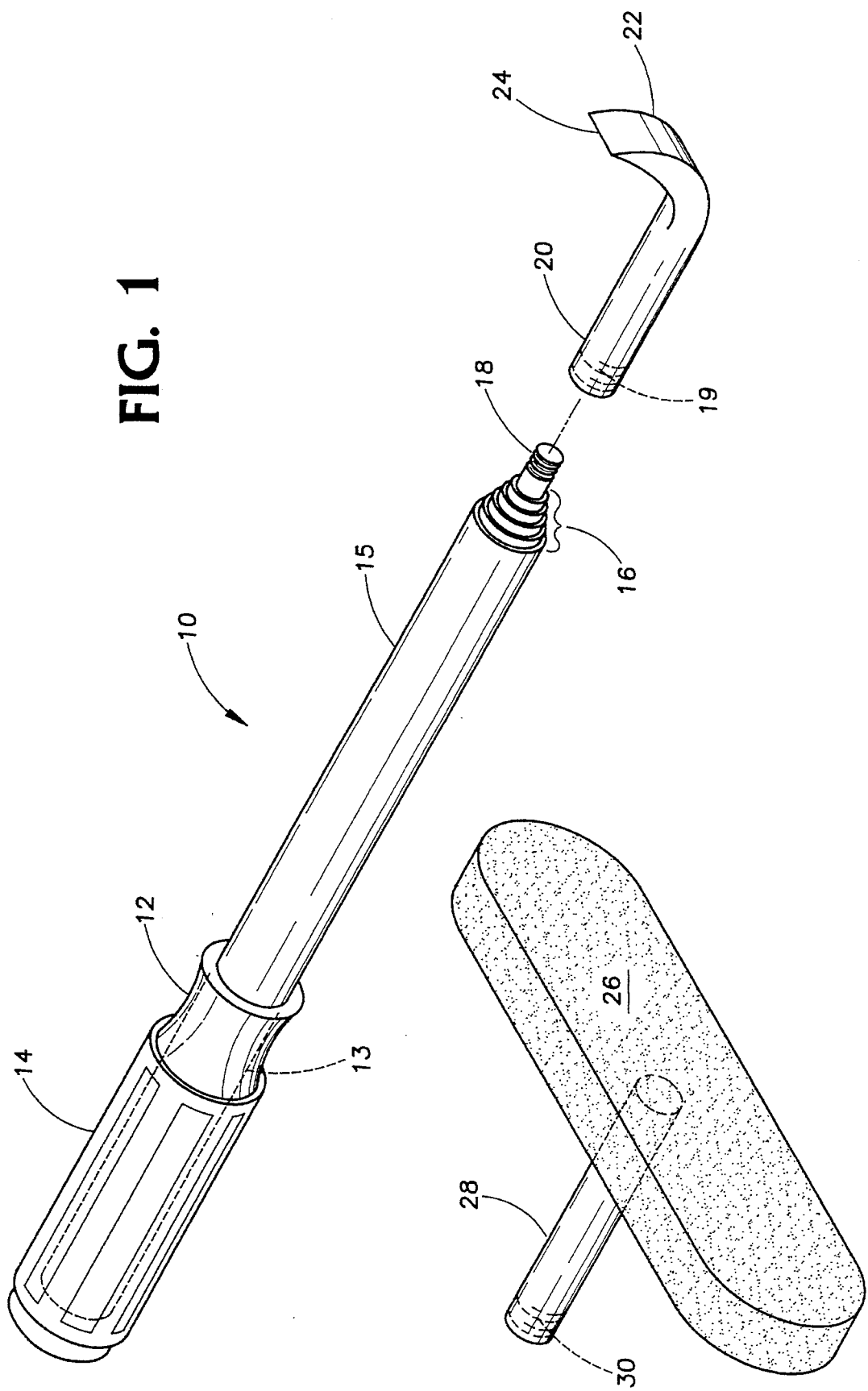
FIG. 1 is a perspective view of the tool of the invention with hook and magnet accessories.

Referring now to FIG. 1 the tool of the invention is shown generally at 10. A handle 12 is shown with receiving means 13. A grip 14 is provided to allow for easier handing of the tool which is relatively small in diameter. Outer tube 15 is secured in receiving means 13 forming the base structure of the tool in the collapsed condition. There are five tubes 16 shown nestled within outer tube 15 with the smallest tube having a threaded male end 18 to engage the threaded female portion 19 of accessory hook 20. More or fewer tubes may be used within the scope of the invention. Hook 20 is provided with a convex surface 22 adjacent edge 24 for the purpose of moving filter material away from the filter frame and allowing edge 24 to achieve a better grasp on the filter frame. Hook 20 is preferably constructed of a strong and lightweight plastic material, although it is well within the scope of the invention to use other materials such as fiberglass or KEVLAR. Handle 12 and each of the tubes 16 are preferably constructed of fiberglass, although other types of composites such as KEVLAR or carbon composites may be used without departing from the spirit of the invention.

Magnet 26 is formed as an elongated ellipse and has a connector 28 and an internally threaded portion 30 for engaging male thread 18 on the tool 10. The shape of the magnet is thus formed to allow the magnet to slide along the duct work in an easy and controllable fashion.

FIG. 2 discloses the invention with the same reference characters as FIG. 1. Telescoping sections 16 are shown in their extended state. The tool although small in diameter would extend to a distance of ten feet.

FIG. 3 shows the tubular members 16 collapsed within tube 15. The relative axial displacement of the tubes is controlled by interiorly and exteriorly extending lips 32 and 34. When the tool is collapsed from the extended position, the innermost tube is pressed in by a force applied between the handle on one end and the accessory on the other end. This force causes tube 38 to move against the resistance of a tight friction fit between the outer tube surface and the extended lips of the adjoining tube which act effectively as bearing surfaces. When the external lips 34 reach internal lips 32, that tube member begins to slide against the resistance of the next tube member until all the tubes are nestled as shown in FIG. 1.

FIG. 4 shows the details of the tube expanded with interiorly extending lips abutting exteriorly extending lips. The tool is extended in the opposite sequence as was described with regard to FIG. 3. In extending the tool a force is applied between the handle and accessory and the tubes slide axially with the smallest tube 38 reaching its limit by engaging lips 32 and 34 and pulling the next tube out as shown in the figure.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A telescoping retrieval hand tool for retreiving debris and filter screens in air management systems comprising:

a) a handle formed from a group of lightweight and strong materials including carbon composites, KEVLAR, and fiberglass;
   a body of the handle;
   a grip substantially surrounding the body;
   a receiving means located along a longitudinal axis of the body further comprising an elongated hollow tube;

b) a tubular means further comprising:
   a first tubular member disposed partially within the receiving means;
   a plurality of elongated tube members concentrically aligned within the first tubular member and having a friction fit;
   the plurality of elongated tube members capably movable in an axially sliding relative relationship;

c) means for limiting the length of extension of the plurality of elongated tube members further comprising an outwardly facing lip at one end of each of the plurality of elongated members and the first tubular member and an inwardly facing lip at the opposite end of each of the plurality of elongated tube members;
   whereby the concentric arrangement of the plurality of elongated tube members allows the outwardly facing lip of an elongated tube member to engage the inwardly facing lip of the elongated tube member in which it is disposed, thereby preventing further axial movement;

d) a plurality of removal tools further comprising:
   an elongated ellipsoidal steel magnet selectively and removably attached to the elongated tube having the longest extension;
   a hook adapted to engage an edge of a screen when the screen is operatively disposed in an air flow duct, the hook selectively and removably attached to the elongated tube having the longest extension; and e) the hook and the tubular means being formed from a strong and lightweight material selected from a group of materials including plastic, fiberglass and KEVLAR.

* * * * *